US011122006B2

(12) United States Patent
Chambers et al.

(10) Patent No.: US 11,122,006 B2
(45) Date of Patent: Sep. 14, 2021

(54) TELEPHONE NUMBER PLATFORM

(71) Applicant: AT&T Intellectual Property I, L.P., Atlanta, GA (US)

(72) Inventors: Patricia Chambers, Morganville, NJ (US); Carol Williams, Covington, GA (US); Madhavi Aruva, Monroe Township, NJ (US); Bronwyn Wirth, Sandy Springs, GA (US); Jon Hermsmeyer, Suwanee, GA (US); Srinivasa Marella, Irving, TX (US); Ranganathan Ramkumar, Duluth, GA (US); Shelly Lazzaro, Dallas, TX (US); Sridhar Ravilla, Coppell, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 68 days.

(21) Appl. No.: 16/296,942

(22) Filed: Mar. 8, 2019

(65) Prior Publication Data

US 2020/0287863 A1    Sep. 10, 2020

(51) Int. Cl.
| | | |
|---|---|---|
| *H04L 29/12* | (2006.01) | |
| *G06F 16/27* | (2019.01) | |
| *G06F 9/54* | (2006.01) | |
| *G06Q 50/30* | (2012.01) | |

(52) U.S. Cl.
CPC ............ *H04L 61/157* (2013.01); *G06F 9/547* (2013.01); *G06F 16/27* (2019.01); *H04L 61/2046* (2013.01); *H04L 61/2053* (2013.01); *G06Q 50/30* (2013.01); *H04L 61/605* (2013.01)

(58) Field of Classification Search
CPC combination set(s) only.
See application file for complete search history.

(56) References Cited

U.S. PATENT DOCUMENTS

| | | | |
|---|---|---|---|
| 5,450,584 A | 9/1995 | Sekiguchi et al. | |
| 6,185,420 B1 | 2/2001 | Choi | |
| 6,272,450 B1 | 8/2001 | Hill et al. | |
| 6,298,352 B1 * | 10/2001 | Kannan ............... | H04M 3/4931 |
| 6,304,647 B1 * | 10/2001 | Frost ...................... | H04M 3/22 |
| | | | 379/201.04 |
| 6,473,503 B1 | 10/2002 | Karau et al. | |

(Continued)

FOREIGN PATENT DOCUMENTS

| | | |
|---|---|---|
| CN | 100401825 C | 7/2008 |
| CN | 100459768 C | 2/2009 |

(Continued)

OTHER PUBLICATIONS

Karin Brumbaugh; "Telephone Number Management in Oracle Communications Unified Inventory Management"; Oracle White Paper; Apr. 2009; 14 pages.

(Continued)

*Primary Examiner* — Phung-Hoang J Nguyen
(74) *Attorney, Agent, or Firm* — BakerHostetler

(57) ABSTRACT

A unified platform for managing telephone number (TN) ordering and procurement lifecycles is provided. The unified platform provides or interacts with functionality for reservations, porting, conflict checks, testing, and industry notification functionality. An associated graphical user interface provides the functionality to a variety of users including customers, salespeople, and order managers.

2 Claims, 10 Drawing Sheets

(56) References Cited

U.S. PATENT DOCUMENTS

| | | |
|---|---|---|
| 6,567,381 B1 | 5/2003 | Jeon et al. |
| 6,661,888 B2 * | 12/2003 | Bell .................. H04M 3/4228 379/219 |
| 7,302,255 B1 | 11/2007 | Lundy et al. |
| 7,386,435 B2 | 6/2008 | Sutinen et al. |
| 7,395,276 B2 | 7/2008 | Cuckson et al. |
| 7,881,452 B1 | 2/2011 | Dianda |
| 8,023,628 B2 | 9/2011 | Schultz |
| 8,170,190 B2 | 5/2012 | Huang et al. |
| 8,265,257 B2 | 9/2012 | Schultz |
| 8,265,259 B2 | 9/2012 | Brown et al. |
| 8,301,471 B2 | 10/2012 | Swamynathan et al. |
| 8,532,695 B2 | 9/2013 | Suetsugu et al. |
| 9,577,980 B2 | 2/2017 | Laux et al. |
| 9,667,777 B1 | 5/2017 | Nagaraj et al. |
| 9,680,989 B2 | 6/2017 | Scully |
| 2004/0193509 A1 | 9/2004 | Cuckson et al. |
| 2005/0117733 A1 | 6/2005 | Widger et al. |
| 2009/0080631 A1 | 3/2009 | Liu et al. |
| 2013/0003958 A1 * | 1/2013 | Brown .............. H04M 3/42297 379/221.13 |

FOREIGN PATENT DOCUMENTS

| | | |
|---|---|---|
| JP | 2002-016694 A | 1/2002 |
| JP | 2006-157158 A | 6/2006 |
| JP | 5528992 B2 | 6/2014 |
| WO | WO 1999/034618 A1 | 7/1999 |

OTHER PUBLICATIONS

"NMS, Number Management System"; Leissner Data AB; https://www.leissner.se/nms/; accessed Jan. 2019; 3 pages.

Peter Bernstein; "Making Telephone Number Management Easy"; Unified Communications; Sep. 2015; 3 pages.

"Inventory & Number Management"; http://6dtech.co.in:80/digital-bss/inventory-number-management; 6d Technologies; © 2017; 2 pages.

"NumeriTrack," Neustar, communications.neustar, Jan. 11, 2019. https://web.archive.org/web/20190111031603 /https://www.communications.neustar/resources/product-literature/numeritrack-solutionsheet.

"X:akta Number Manager"; Aktavara AB; © 2018; 2 pages.

* cited by examiner

TELEPHONE NUMBER PLATFORM

TECHNICAL FIELD

The present disclosure relates generally to systems and methods for managing telephone numbers, and more particularly concerns platforms, interfaces, and methodologies for unifying different functions of telephone number management through the telephone number lifecycle.

BACKGROUND

Telephone Number (TN) management requires consistent business processes and procedures observed across multiple disparate systems that have different implementations. To order and provision TNs, multiple functions must be fulfilled. Different commercial solutions exist for each function, but the process is, in many instances, driven manually by teams of TN management personnel who are frequently distributed in multiple organizations. The number of manual "touch points" results in high error rates and slow processes around TN lifecycle management. This limits the number of TNs that can be provisioned in an order or in a given period of time.

Errors relating to TN ordering or records can present substantial problems for organizations. Data discrepancies in TN databases can result in violations of Federal Communications Commission (FCC) requirements. Erroneous information can also have a cascading effect, such as when incorrect Local Service Records (LSRs) at Local Exchange Carriers (LECs) cause problems for ported TNs. Moreover, failure to verify and deconflict billing can result in multiple billing systems (within one enterprise or multiple enterprises) sending duplicate bills to customers.

There is a need to develop a platform that will unify disparate systems and avoid the costs and problems associated with manual TN administration.

SUMMARY

The needs existing in the field are addressed by the present disclosure, which relates to systems, methods and computer useable media for managing telephone number functions such as ordering and provisioning.

In one general aspect, a unified telephone number platform comprises a reservation component configured to receive a telephone number (TN) order including ordered lines and reserve, for the TN order, ordered lines among an inventory of available lines. The unified telephone number platform comprises a porting component configured to port one or more ported TNs lines between carriers associated with the telephone number order, wherein the one or more ported lines are among the ordered lines. The unified telephone number platform comprises a compliance component configured to add line data for the ordered lines to at least one industry database and a testing component configured to initiate a test for at least one of the ordered lines.

In another general aspect, a method comprises receiving, at a unified platform, a telephone number (TN) order, reserving, using the unified platform, one or more TNs of the TN order on a TN reservation system, collecting, using the unified platform, customer service record (CSR) information for the one or more TNs, creating, using the unified platform, one or more industry files for the one or more TNs, and providing to one or more industry databases, using the unified platform, the one or more industry files for the one or more TNs.

In another general aspect, a non-transitory computer-readable medium can store instructions. The instructions, when executed by a processor, can effectuate operations including receiving, at a unified platform, a telephone number (TN) order, reserving, using the unified platform, one or more TNs of the TN order on a TN reservation system, collecting, using the unified platform, customer service record (CSR) information for the one or more TNs, creating, using the unified platform, one or more industry files for the one or more TNs, and providing to one or more industry databases, using the unified platform, the one or more industry files for the one or more TNs.

This summary is intended to provide a short description of some aspects only. Additional and alternative details will be apparent on review of other portions of this disclosure.

DETAILED DESCRIPTION OF ILLUSTRATIVE EMBODIMENTS

Figure 1:
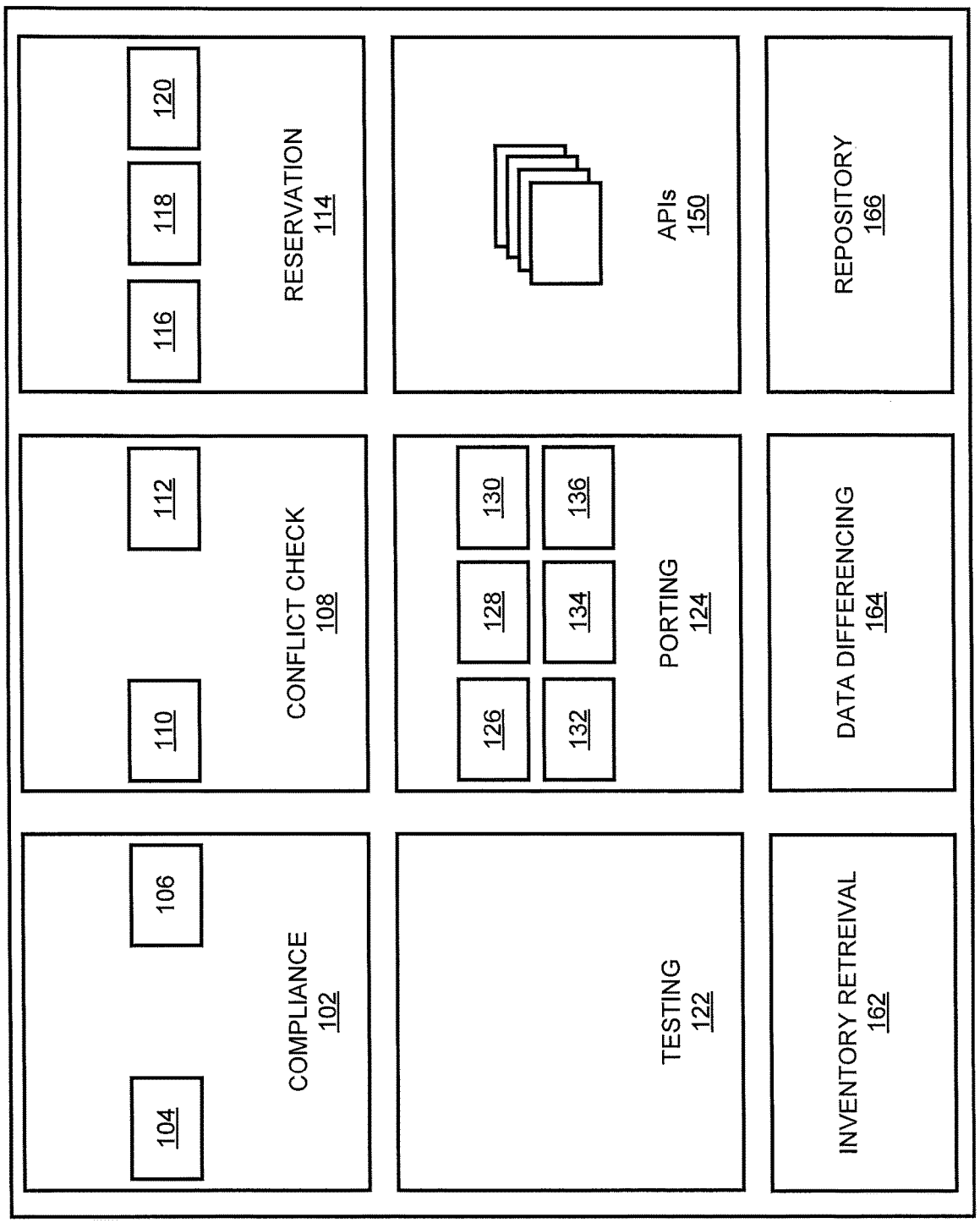
FIG. 1 is an example block diagram of a platform disclosed herein.

Aspects herein describe a unified platform, having a user interface accessible to a variety of parties in varying roles, for TN management. The platform uses a microservices-based architecture and encompasses functionalities for telephone users, internal personnel, sales personnel, order managers, and others to order and manage TNs. The platform can interact with a wide array of external applications, services, and databases, and utilizes a TN container data structure to standardize information and ensure interoperability. The solution is scalable, reduces response time (as both a faster machine service and through elimination of manual steps). The TN lifecycle is accordingly provided with a consistent view and easily managed from ordering to provisioning. The solution accesses various databases and can include its own data repository, allowing sorting, filtering, searching, reporting, and other functionality concerning TN management. Data discrepancies are reduced and data quality improved, reducing labor, increasing customer satisfaction, and avoiding regulatory noncompliance.

Implementations of the platform can be coded in AngularJS and utilize Java and the Spring Framework. Embodiments can alternatively or complementarily utilize other coding frameworks or languages. Simple Object Access Protocol (SOAP) web services and/or Representational State Transfer (RESTful) Application Programming Interfaces (APIs) can be used for various elements of the solution. Exposure of APIs allows sales and end customers to access TNs directly as opposed to relying on third parties. The platform is widely compatible with a variety of programs, systems, and services, including but not limited to AT&T Collaborate (AT&T product blending voice, chat, video, presence, conferencing, which can also manage TN orders)/Trinity, Service Delivery Migration Experience (SDMX), IP Toll Free, IP Flexible Reach (a Session Initiation Protocol (SIP) trunking service that delivers integrated access for internet protocol (IP) private branch exchange (PBX), time division multiplexers (TDM) PBX or Key System environments, providing potential total cost benefits through the consolidation of voice and data), IPFLEX Over-the-Top (OTT), Voice Digital Network Architecture (DNA) (VDNA), SDMX/Primary Rate Interface Service (PRI) to IPFLEX, Time Division Multiplexing (TDM) Voice to Collaborate, Carrier Voice over Internet Protocol (CVOIP), and others described herein. Moreover, the platform can provide TN management in instances where users do not possess or have access to such programs, systems, and/or services.

Aspects herein can be implemented automatically using a unified telephone number platform. While manual action is compatible and may be used at times, it is understood that, unless expressly stated to the contrary, actions concerning ordering, reserving, porting, satisfying compliance and industry notification, et cetera, for TNs can be completed automatically based on the platform and systems or services with which the platform interacts. It will be understood by those skilled in the art that the disclosure encompasses more than simply automating a manual system, but rather provides a practical application that solves a technical problem and introduces new technologies for replacing, augmenting, supplementing, or linking disparate systems.

As used herein, a TN order is a request by an entity (which can be an order manager, customer, or any other party) to acquire one or more telephone lines and associated line number.

As used herein, industry databases are databases provided under regulatory, industry standard, or cooperative architectures to facilitate interoperability, compliance, or rich data in various service sectors. Non-limiting examples of industry databases described herein include enhanced 911 (E911) databases, Line Information Database (LIDB) databases, Caller Name Identification (CNAM) databases, et cetera.

Platform 100 provides direct access to TN ordering and management for sales, customers, and other entities. The entities utilize an interface that provides the unified platform 100 for managing, ordering and provisioning of telephone numbers by consolidating various disparate TN functions previously implemented through multiple applications with many interfaces and requiring substantial manual intervention by multiple parties. Platform 100 provides an architecture that realigns system responsibilities that increases automation and can be reused for multiple services. Platform 100 includes compliance component 102, conflict component 108, reservation component 114, testing component 122, and porting component 124.

Platform 100 and other aspects described herein use a common TN data model to reduce complexity and allow for faster retrieval and manipulation of TN data. This also simplifies API design through schema type reuse. The TN data model can utilize a TN container data structure representing one or more TN numbers (which can, but need not, be TN orders).

Compliance component 102 provides for industry notification concerning line data for a TN order. In embodiments, compliance component is configured to add line data for ordered lines of the TN order to an industry database. Compliance component 102, in embodiments, can include create subcomponent 104, which can orchestrate creation of files used in industry databases for lines from a TN order, thereby complying with regulations, standards, agreements, best practices, et cetera. Particularly, create subcomponent 104 is configured to create emergency files (e.g., industry E911 files) and line identification (e.g., Line Identification Database (LIDB) file, Caller Identification Name (CNAM) file) files associated with each number of the TN order. Create subcomponent 104 can allow users to toggle between partial and full automation, the former creating a task for review of the data, and the latter handling file creation automatically. Complete subcomponent 106 is configured to provide line data, including the emergency and/or line identification files, to the recipient of the industry database information. Complete subcomponent 106 provides these files directly to industry databases or provide them to intermediary components in communication therewith.

Conflict component 108 is configured to identify one or more billing conflicts associated with the ordered lines. Conflict component 108 includes check subcomponent 110 and reconcile subcomponent 112. Check subcomponent 110 is configured to gather the TNs being added to an order and check if they are being billed by any other biller. Check subcomponent 110 thus confirms the customer will not be double billed when the order is completed. Any TNs that are identified as being billed by another biller (TNs with conflict) will be held and can be displayed or otherwise flagged for, e.g., the party placing the order or another entity involved in the TN order (e.g., technical support).

Before the order is sent to a biller, reconcile subcomponent 112 is invoked. If TN conflicts were found during the Check Billing Conflict function, then an automated request will be sent to create a disconnect order in the billing system where the TNs are being billed. In an example, the biller can bill through Business Voice Over IP (BVOIP) services (which can also facilitate TN ordering and management). If an automated disconnect order is successfully created, then the order will be sent to a billing system in communication therewith (e.g., a BVOIP billing system) to start billing. If the automated disconnect order is unsuccessful, then a manual task can be created for user to manually create a disconnect order for the conflict TN(s). Once completion of the task is received the biller is notified to start billing.

Reservation component 114 serves to reserve TNs associated with a TN order. Reservation component 114 includes reserve subcomponent 116, validate subcomponent 118, and cancel subcomponent 120. Reservation component 114 is configured to receive the TN order and reserve ordered lines among an available inventory of lines.

Reserve subcomponent 116 generates reservation requests from a TN order (e.g., from the sales and ordering system for the customer). In embodiments, the reservation request may be the order itself, but in alternative embodiments a reservation request can be generated based on the order. Reserve subcomponent 116 automatically reserves the TNs associated with the order. In embodiments, if one or more TNs cannot be reserved automatically, then reserve subcomponent 116 can create a manual task for a work center user to manually reserve the TNs or otherwise resolve the issues preventing reservation.

Validate subcomponent 118 is invoked after the order is submitted from ordering. Validate subcomponent 118 checks that a reservation exists for the TNs on the order. Validate subcomponent 118 can also check to ensure that the reservation date is not expiring. Confirmation that a reservation date is not expiring can assess, quantitatively or qualitatively, how soon the reservation expires. Quantitative comparisons can analyze whether the reservation expiration is within, e.g., a threshold length of time, which can be fixed in time in terms of hours or days (e.g., within 48 hours of expiration, within two weeks of expiration), or dynamic (e.g., within one week for one order and within two weeks for another order; within one week by default but increased to within two weeks based on a lack of movement in the order; et cetera) based on a particular order. Qualitative assessments can determine whether a reservation is at risk of expiring based on how much of an order process remains to be completed, the state or change in state of other orders (indicating, e.g., the speed of order handling in general), and so forth. If the order is within a timeframe or threshold of expiring, validate subcomponent 118 can create a manual task to alert a user to take action.

Cancel subcomponent 120 can automatically cancel the reservation after acknowledgement by platform 100 or in downstream systems in communication therewith if the order was cancelled or customer cancels the reservation. Cancel subcomponent 120 allows the TNs to be put back into the TN inventory and become available for another customer promptly and without requiring manual intervention.

Reservation component 114 can also be configured to auto-release expired reservations. In accordance with FCC requirements, TNs should not be held in a reserved state for more than 180 days. If a reserved TN associated with an order is not provisioned within 180 days, the TNs can be released and the customer can be notified. Reservation component 114 can also perform reservation scrubbing to determine if TNs associated with orders are in use to prevent making reserved TNs available to other customers. Reports can be issued by reservation component 114 or other elements of platform 100 to reflect the results of scrubbing.

Reservation component 114 can interact with software such as, e.g., Numeritrack. Reservation component and/or other elements of platform 100 can provide a variety of functions from Numeritrack databases to sales, ordering, eServicing, or ebonding services, such as, e.g., providing lists of available TNs (which can be VOIP TNs), releasing inquired TNs, reserving specific TNs, confirming reservations, and cancelling reservations. Reservation component and/or other elements of platform 100 can also provide a variety of functions invoking a Numeritrack database to workflow or other aspects of TN management, including activating TNs and determining whether to return a ported TN after disconnect.

Testing component 122 provides the capability to test TNs associated with a TN order. In some embodiments, testing component 122 can review ported TNs on an order and/or schedule and initiate line tests for all or a portion of the ported TNs. Individual tests can determine if lines are portable (using tools such as, e.g., an Interactive Voice Response (IVR) service such as VoiceTone). Customers, salespeople, or other interested parties can be notified during the ordering process if one or more lines in a TN order cannot be ported. Testing component 122 also alleviates the occurrences of manual action by reducing instances of technicians identifying non-portable lines at customer sites (e.g., during test or turn-up dates).

While testing may concern the testing of ported lines—because testing typically relates to contacting a line that has been provisioned—testing component 122 can, in embodiments, perform alternative tests. For example, non-ported lines could be tested after provisioning. Further, testing may be employed to be confirm if a line is inactive, rather than provisioned, to confirm assumptions about its status.

Porting component 124 provides automation of the TN porting process, thereby moving ported lines (TNs among the TN order) between carriers based on TN orders. (Examples of products or processes which can be automated include porting using BVOIP or Collaborate). Porting component 124 provides a table to identify the Local Service Request (LSR) creation (which can be automatic or manual in various embodiments) and provide for communication of the LSR to a carrier (e.g., Incumbent Local Exchange Carrier (ILEC) or Competitive Local Exchange Carrier (CLEC)) for the TN Order. Porting component 124 can further monitor creation of subscription versions, initiate activation of TNs, and initiate updating of directory listings.

Porting component 124 can include a number of subcomponents. LSR creation subcomponent 126 analyzes LSR rules to determine if an LSR can be created and submitted automatically to a carrier. In instances where LSR processing cannot be automated, LSR creation subcomponent 126 can stage a task for handling by an agent. Even in this latter instance, partial automation can be utilized to allow automation of order updates after manual creation or action. User interface 200 associated with platform 100 can be provided to users to assist with manual tasks where automation cannot act independently.

LEC pending port request subcomponent 128 can create a subscription version of a foreign port/Local Number Portability (LNP) in the LNP Service Order Administration (SOA) application and indicate a 'Pending for Activation' status (e.g., setting such status in the application).

Activation initiation subcomponent 130 is configured to automatically initiate activation of one or more pending foreign ports in an LNP SOA. After TNs are activated, activation initiation subcomponent 130 can send a request to the Number Portability Administration Center (NPAC), which in turn broadcasts the port out to both LNP SOA and LEC SOA.

Port status subcomponent 132 verifies that ports are still pending for activation. In an embodiment, this can be accomplished using LNP tools from one or more applications which query an LNP SOA's subscription version information.

Internal port subcomponent 134 verifies that the Local Routing Number (LRN) provided by a Local Exchange Routing Guide (LERG) application is different from the LRN on the TN in the order. After confirming that the LRNs are different, internal port subcomponent 134 sends a request to an LNP SOA to create and activate a subscription version for the Internal Port/LNP.

Directory listing subcomponent 136 extracts directory listing to provide information and prepopulate data associated with a TN order. In embodiments, directory listing subcomponent 136 extracts data from CSRs. Directory listing subcomponent 136 can capture and correct directory listing data in embodiments in some embodiments. Another alternative or complementary directory listing subcomponent 136 can send a request to Local Order Management Tool (LOMT) to update customer directory listing information when porting is completed.

Porting component 124 and its associated subcomponents can validate data associated with one or more TNs of an order with LERG to access information such as, e.g., LEC owner, whether the TN is ebonded (electronically linked), and associated data (e.g., Service Provider Identifier (SPID), e911 type, LRN, Switch Type, Switch Common Language Location Identification (CLLI), et cetera) for use issuing LSR and provisioning the TN. Porting component 124 can facilitate a query automatically retrieve CSRs from ebonded LEC and prepopulate such information into orders. Further, porting component can extract CSR data to display on a document, with documents stored in a document repository for users to view. Porting component 124 can also handle non-portable TNs based on non-portable order codes (e.g., Universal Service Order Codes (USOCs)). If TN information extracted from CSR indicates that the TN is associated with a non-portable code, these TNs can be flagged and in embodiments automatically removed.

As noted above, platform 100 can interact with a variety of different applications for managing elements of TN order processes. To allow the applications to interact with platform 100, and to allow platform 100 to send information to and receive information from the applications, a variety of APIs 150 are included in or associated with platform 100. APIs herein can be Simple Object Access Protocol (SOAP) or Representational State Transfer (RESTful) APIs, and embodiments disclosed can include different APIs using one or the other (e.g., single system can use both SOAP APIs and RESTful APIs). To provide for an interoperable framework, TN orders can be arranged and communicated according to TN containers by platform 100 and various associated APIs. In embodiments, platform 100 can include application-specific APIs. In alternative or complementary embodiments, a single API can provide access to at least a portion of the platform 100 to or from two or more distinct applications.

An example of one of APIs 150 can include an API for generating a TN container with a container identification. In embodiments, a TN container need not contain TNs. Platform 100 can store data regarding TNs and TN containers and respond to external nodes with communications including headers providing the container identification. The containers can be used to manage new and existing reservations and cans store data related to ported or reserved TNs.

Another example of one of APIs 150 can include an API for associating external order numbers with TN containers. Platform 100 can determine if there are any unresolved errors with external order numbers. Automation associated with handling of the TN order, and particularly ported numbers associated with a TN container, can proceed if no unresolved errors are found. If unresolved errors are present, portions of the order may proceed and/or manual tasks can be created and provided back to applications for resolution. Tickets or tasks can include links to user interface 200 associated with platform 100.

Another example of one of APIs 150 can include an API for updating TN containers and storing data associated therewith. This data can be used for processing TN reservations, ported TNs, or other information associated with the order and/or table. TN data will be stored in the TN Platform database.

Another example of one of APIs 150 can include an API for communicating with clients, performing directory listing (DL) validations, and performing conflict checks with applications including but not limited to ordering, provisioning, inventory, and billing systems (e.g., Global Computing Platform (GCP), Enterprise Data Fabric (EDF)), order management systems (e.g., Global Integration Order Management System (GIOM), Order Capture Express (OCX) Order Management System (OMS)), Billing Gateway (BGW), Service Provisioning Platform (SPP), et cetera. If validation errors exist, platform 100 can create tasks to have them address automatically or manually. Processing of TNs can be indicated as complete if no conflicts exist.

Another example of one of APIs 150 can include an API for requesting to cancel a TN order or cancel a TN container associated with an order. Platform 100 can update records and mark records cancelled based on cancellation requests received through APIs 150. All automated or manual tasks pending or open can be reinvoked or cancelled by platform 100. One or more APIs can interact with an order management system or software package to request, from the platform, e.g., expiring TN reservations or order cancellations, and the platform can report to the order management system, e.g., status reports on the TN orders. The same or another API can interact with an order database to allow the platform and database to exchange information for cancelling or supplementing orders.

Another example of one of APIs 150 can include an API for sending requests to platform 100 to submit a TN container. Platform 100 can send a response to client based on the communication.

Another example of one of APIs 150 can include an API for amending or supplementing a TN container. The TN container version number can be incremented based on amendment or supplementation. Platform 100 can create new container versions based on requests from clients or its own actions. Versions can be associated with order statuses (e.g., deliver, negotiation). If an error occurs with amending or supplementing TNs, platform 100 can create a Common Task Handler (CTH). A ticket or task associated with an error can include a link to user interface 200 associated with the platform 100. Tickets or tasks associated with such errors can be arranged for automatic, semi-automatic, or manual handling.

Another example of one of APIs 150 can include an API for withdrawing a requested or in-process amendment. When clients interact with this API, platform 100 can delete records for the latest version of a TN container and/or withdrawal amendments. If the version number of a TN container is less than a current version during a request to withdrawal a requested or in-process amendment, an error can be returned. A ticket or task can be created by platform 100 based on the error. Tickets or tasks associated with such errors can be arranged for automatic, semi-automatic, or manual handling.

Another example of one of APIs 150 can include an API for returning a status of various TN order processes. Particularly, a client can request a latest status (or other information), or an automated notification event can occur, based on, e.g., creation of TN container, updating a TN container, resuming a TN container, associating a TN container with an order, amending a TN container, canceling an amendment, canceling an order, et cetera. Messages providing information including but not limited to such aspects can include a TN container or order information, message identification, message payload, error codes, error types, failover requirements, retry notification, event name and value, et cetera. In embodiments, multiple errors or events can be included as additional events or errors within a notification.

Another example of one of APIs 150 can include an API for handling conflicts. The API can be used to check billing, ordering, provisioning, and inventory systems to determine if a TN associated with an order exists in another system prior to adding it to an order or processing an order containing the TN. In embodiments, platform 100 can use information received through a conflict API to remove or instruct removal of TNs from legacy accounts or systems before or after an order is submitted.

The same or different APIs can be used in porting situations. An order management system can provide a trigger for porting, via an API, to porting component 124 or other elements of platform 100. Statuses can be passed back to the order management system requesting the port using the same or a different API. Another API can interact with testing applications to test the ported number or its capabilities, and still additional APIs can provide access or notifications to customers requesting ported TNs. The same or another API can interact with an order database (e.g., GIOM) to allow the platform and database to exchange information for cancelling or supplementing orders.

APIs 150 can also provide access to billing order systems, exchanging billing order information as well as auto-filling billing order information or comments, locating or assigning company names, and resolving traditional Master Street Address Guide (MSAG) addresses. APIs 150, in support of this information sharing, can also interact with MSAG inventory and industry inventory systems, to resolve MSAG information and company BAN/SAN, respectively.

APIs 150 can also interact with systems for TN reuse by communicating with, e.g., billing order systems, TN reuse check systems, Customer Account Data Management (CADM) systems (to find existing CADM accounts), and inventory accounts (to search for existing accounts).

In embodiments, platform 100 can include inventory retrieval component 162. Inventory retrieval component 162 can be provided to retrieve relevant TN data from an inventory. Additionally, in embodiments, platform 100 can include data differencing component 164. Data differencing component 164 can compare TN data across inventory, ordering, and versions and determine what (if anything) has changed since a previous check. This can ensure that records are current in view of ongoing and automated TN ordering, and identify discrepancies if present.

A user interface 200 can be implemented in conjunction with platform 100. User interface 200 can be accessible to one or more entities and may vary based on the permissions or role of entities. User interface 200 can include header bar 210 containing information about the platform 100. Search bar 212 allows for searching of one or more TN containers, or groups of containers, used on the platform. Account details 214 identify the current user and allow the user to view or modify a customer order on the platform. Container status bar 216 shows the customer name. Thereunder, TN data pane 218 includes elements for viewing or selecting non-ported TNs numbers 220, ported numbers 222, TN Conflict with Ordering, Provisioning, billing or inventory 224, CNAM/LIDB data or information 226, and directory listing 228. Layout control 230 displays one or more headings for content pane 232 displayed in content pane 232. Content pane 232 can display, e.g., reservation information, porting information, TN lists, TN attributes, et cetera, and/or the various dynamic content described hereafter. Under content pane 232, TN status 234 can be displayed. In embodiments, TN details can comprise porting details. Additional controls can be provided in user interface 200, including but not limited to a button to submit a TN container 236, a button to validate a TN container 238, and a button to unlock a TN container 240.

Figure 2:
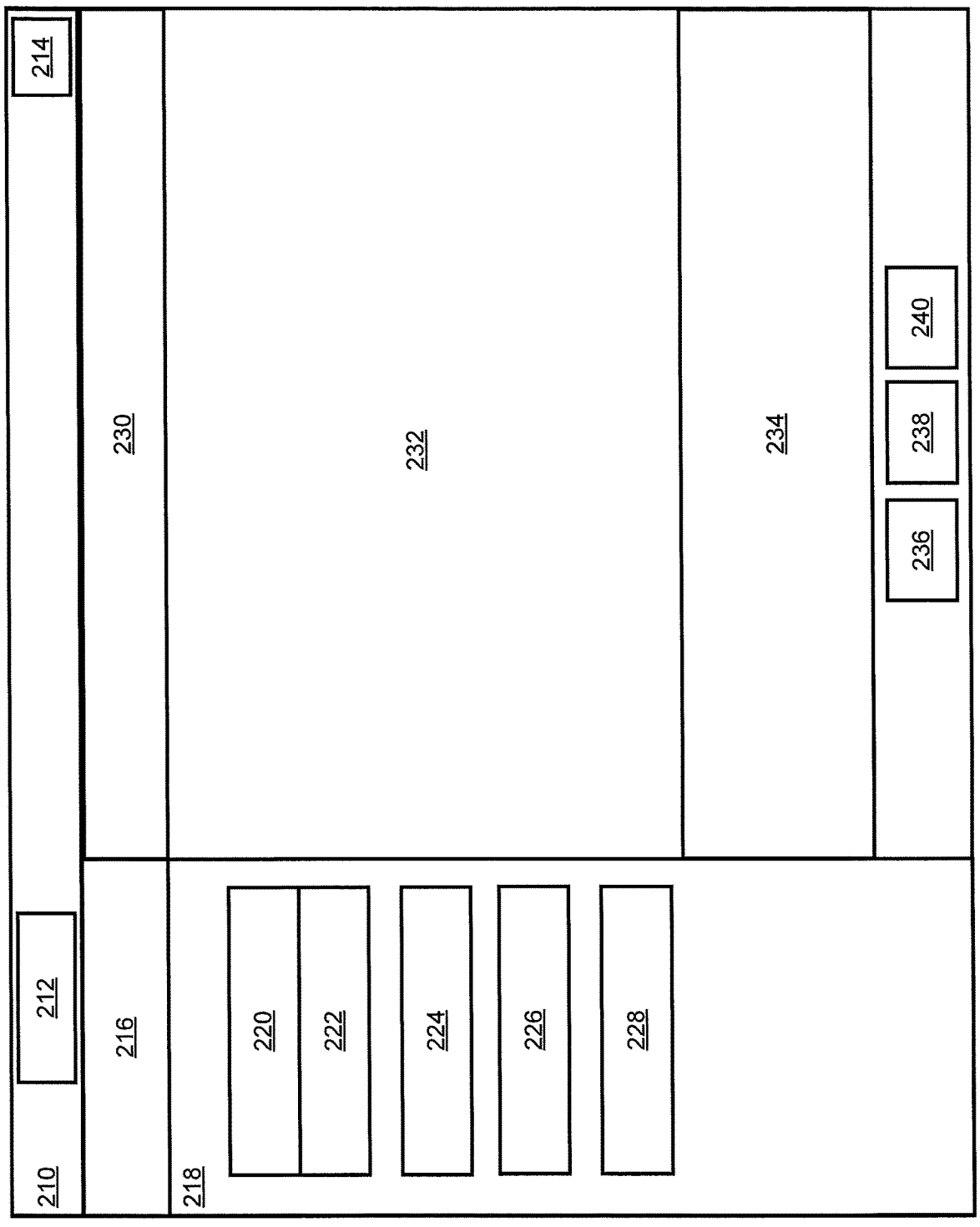
FIG. 2 is an example block diagram of a user interface disclosed herein.
Figure 3:
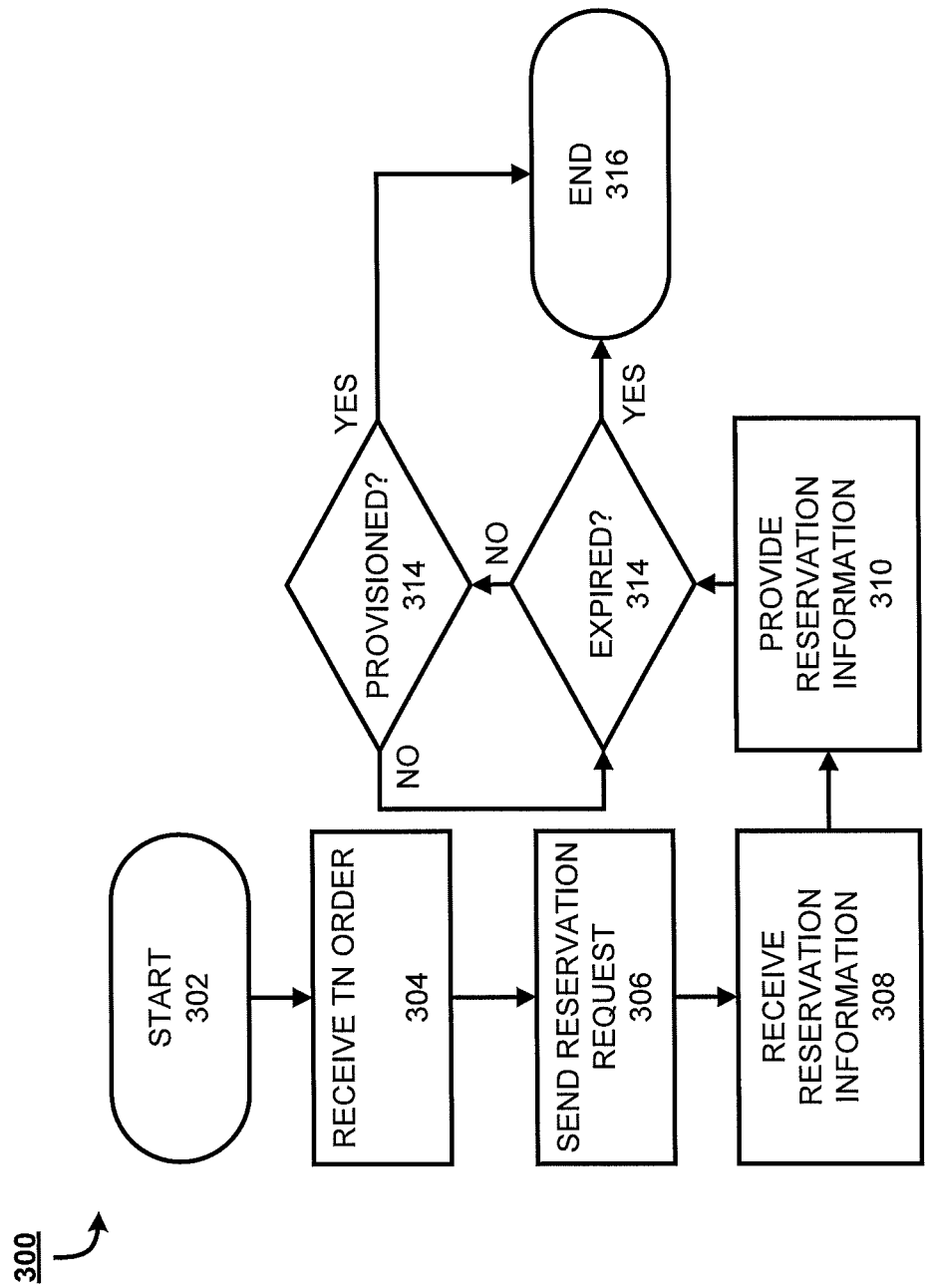
FIG. 3 is an example flow chart of a methodology disclosed herein.
Figure 4:
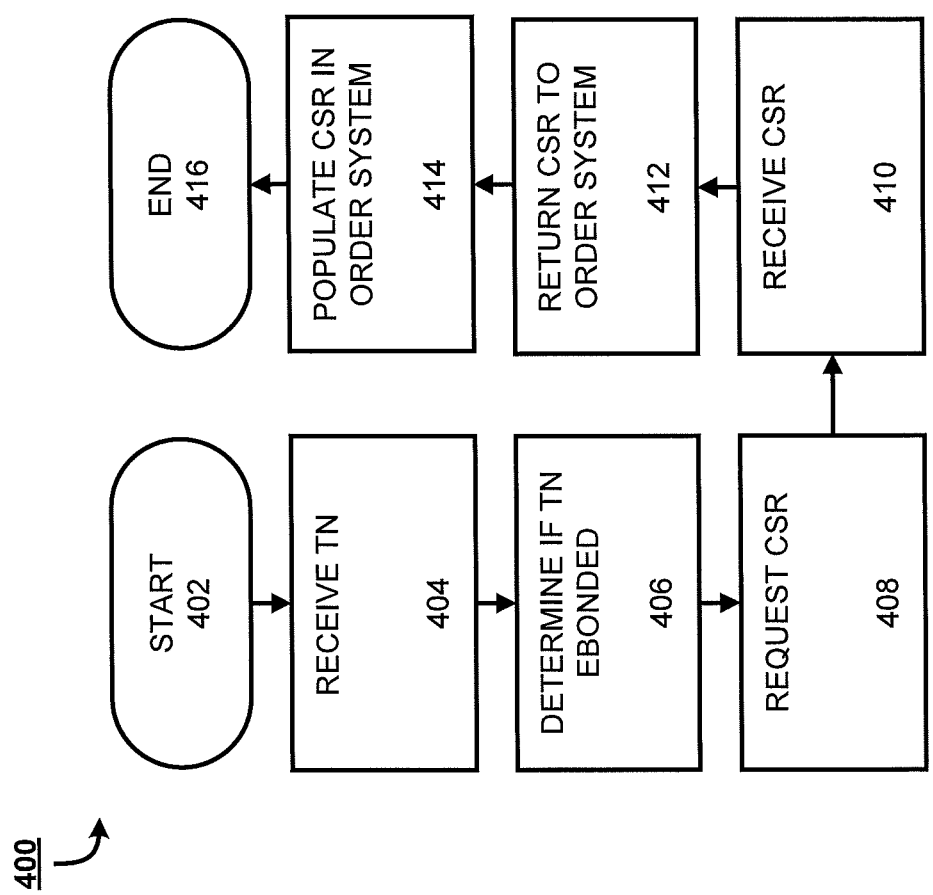
FIG. 4 is an example flow chart of a methodology disclosed herein.
Figure 5:
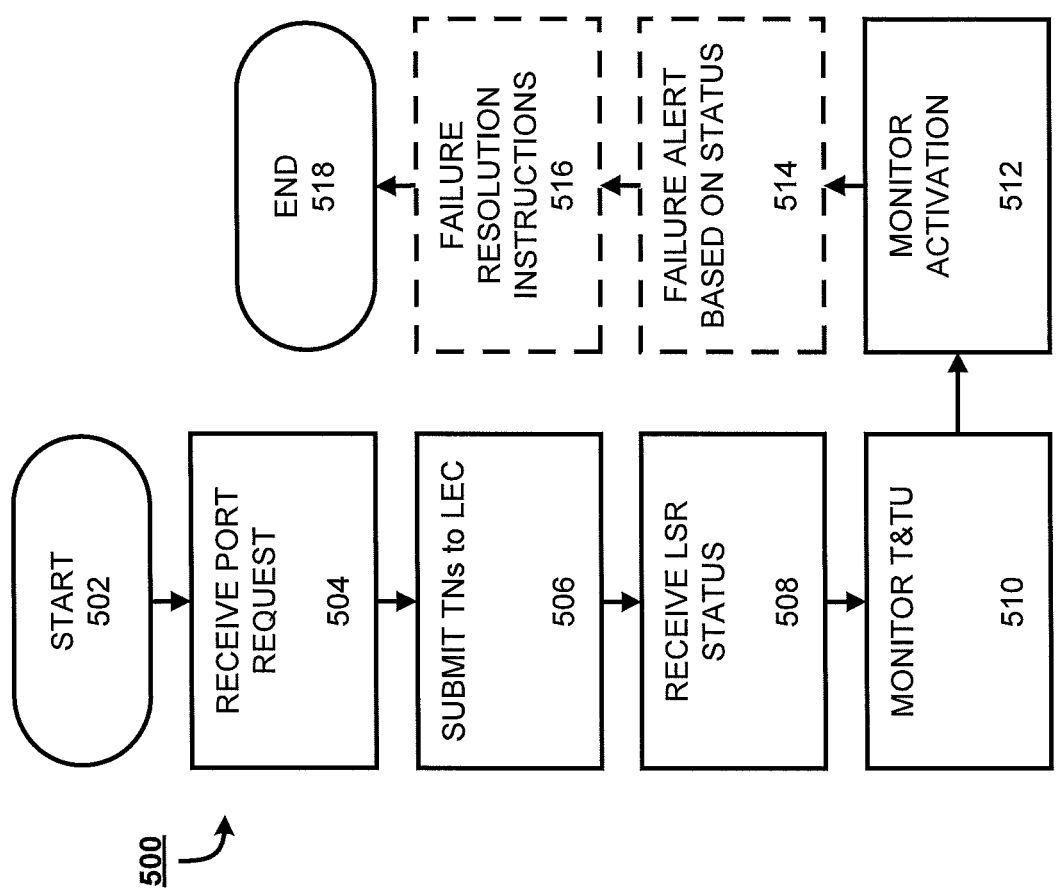
FIG. 5 is an example flow chart of a methodology disclosed herein.
Figure 6:
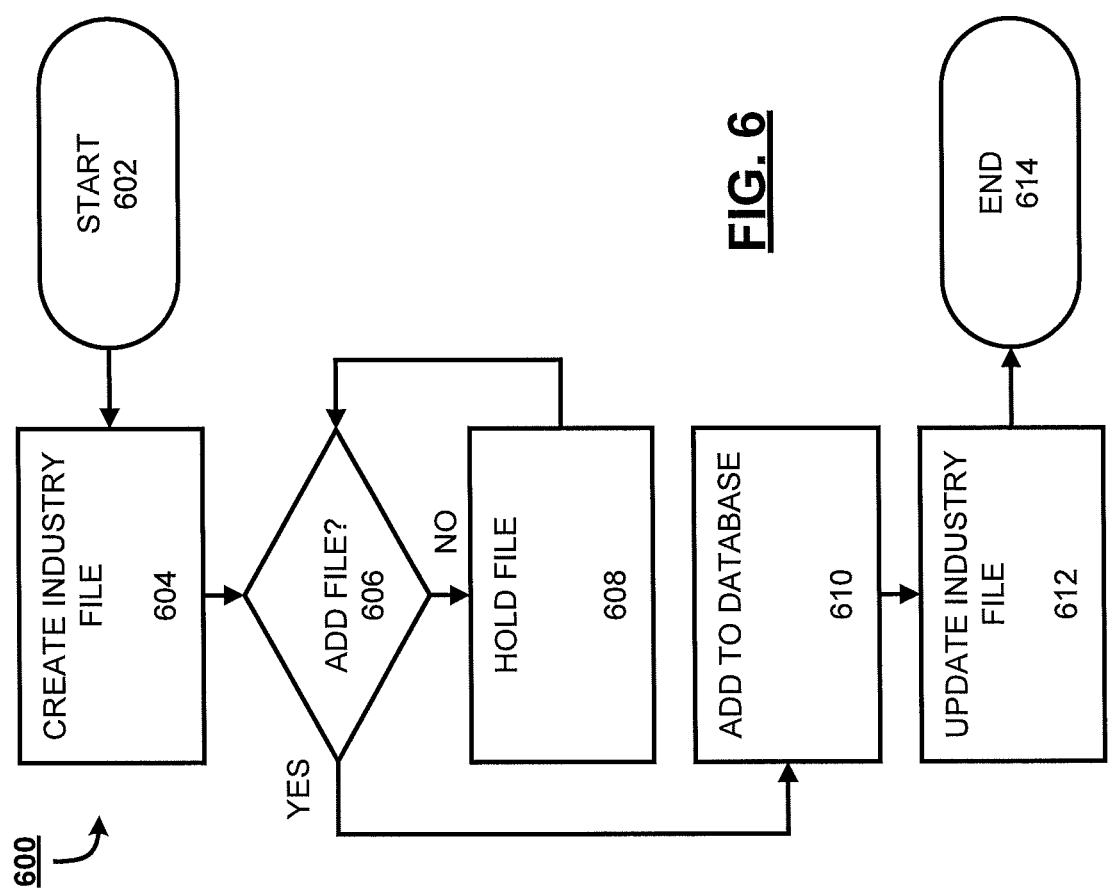
FIG. 6 is an example flow chart of a methodology disclosed herein.

User interface 200 can include a variety of dynamic portions beyond those illustrated in FIG. 2. Dynamic portions can be provided by changing, e.g., content pane 232 or other portions of interface 200. Alternatively or complementarily, dynamic portions can be presented with pop-ups, overlays, or other techniques. Examples of such dynamic aspects are described hereafter.

User interface 200 can include a reservations interface that interacts with reservation functionality provided by platform 100 including but not limited to reservation component 114. The reservations interface can provide users access to request new reservations, retrieve existing reservations, and provide reserved TNs (e.g., through selection, manual entry, upload of spreadsheets, et cetera). The reservations interface can allow rule-based reservations, by which TN criteria can be specified to automatically reserve TNs. Existing reservations can be automatically retrieved by reservation number, line number, order number, et cetera. Previously reserved TNs can be automatically retrieved or manually entered. The reservation interface also provides upload functionality to receive files containing TNs, reservations, orders, or information related thereto. Similar information can be batched and downloaded (e.g., documents, spreadsheets, or individual records can be downloaded).

User interface 200 can also include a reservations status interface. The reservations status interface can display request identification, reservation identification, and status, as well as errors (if any), which are associated with an automatic reservation request. A refresh function can be included to allow a user to manually request updated statuses of reservations, and the statuses can automatically refresh periodically (e.g., every minute, every hour) or in real-time or continuously. The reservations status interface can include functionality (e.g., tables, check boxes, buttons) to allow the selection of rows, rows per page, or other entries. Selection can allow for cancellation, removal, amendment, or other changes to selected reservations, which can change the reservation status. The user can change the view (e.g., rows per panel) using the reservations status interface (using, e.g., layout control 230).

User interface 200 can also include a view reservations interface that displays reservation request details.

User interface 200 can also include a view TN interface. The view TN interface can display retrieved and/or validated data elements (e.g., emergency provider type, LRN, switch type, switch CLLI) for reserved TNs. The view TN interface can include functionality (e.g., tables, check boxes, buttons) to allow the selection of rows, rows per page, or other entries. Selection can allow for deletion or modification of TNs. The user can change the view (e.g., rows per panel) using the view TN interface (using, e.g., layout control 230).

Various portions of user interface 200 can also display or provide information concerning ported telephone numbers. A ported TN interface can facilitate retrieval of CSRs (which may or may not be ebonded) through entry or identification of TNs (e.g., Billing Telephone Numbers (BTNs), Working Telephone Numbers (WTNs)). Interface portions concerning porting can also allow retrieval of CSRs with additional information (e.g., service address, directory listing, address) from LECs. TN lists or other data can be uploaded or downloaded in various formats, and non-bonded CSR processing allows capture of various information (e.g., service address, directory listing, directory listing address) associated with provided TNs (e.g., BTNs, WTNs). Users can toggle, using the interface, between automatic and manual functionality (e.g., for providing of TNs, entry or editing of CSRs). Various information sent or received using interface 200 can be stored in conjunction with platform 100 using document repository 166.

Various portions of user interface 200 can be used to perform TN comparison and selection. Reconciliation between TNs on order and TNs on CSR can be performed with results provided. Users can select to add TNs to orders and determine disposition of ports for disconnection using various selection mechanisms (e.g., checkboxes, row selection). Selection of TNs to add to an order can automatically trigger validation and status update (e.g., verified on CSR, requested, pending add) for each TN. Error messages can also be displayed (e.g., if errors are encountered during CSR retrieval or validation). LSR override functionality can also be presented through TN comparison and selection portions of user interface 200. LSR override allows users to request manual handling for LSRs.

Portions of user interface 200 can also be provided for management of CNAM/LIDB information as it relates to TNs. Users can import, view, manage, or edit information associated with a TN such as Caller name, LIDB data (Allow Collect Calling and 3rd Party Billing, Restrict Collect Calling, Restrict 3rd Party Billing, Restrict Both), InterLATA PIC/IntraLATA PIC and InterLATA PIC Freeze Indicator/IntraLATA PIC Freeze Indicator, et cetera.

Portions of user interface 200 can also provide directory listings and assist with directory management. Platform 100 can extract directory listings from CSRs and perform directory listing validations, displaying the results in user interface 200.

Various methodologies are enabled using platform 100 and interface 200. Examples of such techniques are described hereafter, in view of earlier techniques to emphasize the significance of a TN platform and automation.

Prior to the implementation of platforms like platform 100, techniques for requesting a reservation involved a number of manual steps prone to error and requiring access to a variety of disparate systems. An order manager would manually fill out a TN reservation request using a TN tool. Thereafter, a Local Number Service (LNS) representative would manually reserve the TN and complete LNS forms including the TNs of the request. An LNS reservation number was generated when TNs were manually reserved, and the LNS representative would then manually contact the order manager to provide the LNS reservation number. The order manager would then log into the LNS and access the LNS request using the reservation number to access the TNs. The order manager thereafter copies the TNs from the LNS and manually provides the TNs to the ordering systems.

Using techniques described herein, a methodology 300 provides a TN reservation process. Methodology 300 begins at 302. A sales manager, order manager, or other party provides new TN reservation requests in the form of a TN order including quantities of local and/or virtual TNs, which can include vanity or reinstated TNs. The TN platform receives this order at 304. At 306, the TN platform receives, through an associated unified interface, the requests and sends an automated reservation request to an automated reservation system. For example, the automated reservation system can be, e.g., Numeritrack. The automated reservation system returns the TN reservations associated with the TN to the TN platform at 308, which automatically provides the reservation information to the ordering system (which may or may not be the system through which the TN order was received) at 310.

Automated TN reservation as performed with methodology 300 provides visibility to FCC-mandated expiration dates for reservations through interfaces such as those described herein. Such interfaces can be integrated with an ordering user interface. In embodiments, methodology 300 can determine, at 312, whether a reservation has expired, and at 314 automatically release the reservation if so. Methodology 300 can thereafter terminate at 318. If the reservation has not expired, methodology 300 can determine if the TN(s) of a reservation are provisioned at 316. If the determination at 316 returns negative, methodology 300 can recycle to 312. If the determination at 316 returns positive, methodology 300 can terminate at 318.

Methodologies for automating porting processes can also be provided. Earlier porting processes involved manual steps performed by an order manager including determining a LEC for the BTN, and requests a CSR from the LEC-specific system or requests information from the customer. Thereafter, the order manager obtains a copy of the CSR or customer information (verifying the customer's telephone numbers and associated attributes using, e.g., a bill) and enters the BTNs, WTNs, and directory listings into an ordering system. This step in particular can be highly labor intensive and discrepancy prone for orders involving a large number of TNs. The order manager then manually reconciliates the TNs on the CSR in view of the TN(s) on the order, and removes any TNs from the order that do not exist on the CSR. This improves over the existing practices that require users or other parties to manually scrub a CSR to determine if the TNs are associated with non-portable USOCs. Automatic USOC checking presents dramatic resource savings and avoids errors associated with manual procedures.

In contrast, methodology 400 automates the CSR process. Methodology 400 begins at 402. A sales manager, order manager, or other party enters the TN (e.g., a BTN) into a sales or ordering system for submission to the TN platform, and the TN platform receives this TN at 404. This can be done individually by TN or using a TN order or TN container including one or more TNs. At 406, the TN platform validates the TN and determines if the TN is ebonded. The platform sends automated CSR requests to the LEC at 408, and receives CSR data in return at 410. At 412, the platform returns ebonded CSR data to an ordering system (which may or may not be the same ordering system used to submit the TN order) and, at 414, the ordering system automatically prepopulates required fields, eliminating human data discrepancies, or can confirm and verify previously populated fields. TNs not in the CSR are automatically disregarded by the platform.

Methodology 400 can be used in conjunction with an interface described herein. In embodiments, methodology 400 can provide comparison or reconciliation views of the WTN on the CSR against the WTNs on order.

Methodology 400 supports provisioning efforts by enabling mechanized LSR creation, supporting and facilitating manual LSR creation and submission, enabling directory listing updates, and supporting LEC escalations for Firm Order Commitment (FOC) date issues. This feature also supports LNP handling. There is no system in AT&T which has a compatible feature set. The solution today is manual, where users complete the LSR manually and submit manually to LEC. TN Porting automated the creation and submission of the LSR to the LEC.

Techniques herein can also provide automation to LSR workflows. Prior techniques for LSR workflows involved reacting to a system failure for failing to generate a task. In response, the order manager manually monitored the SOA to ensure one or more TNs were in a correct status. The LSR provides a supplemental task if mechanized LSR was not being sent to the LEC. The LEC agent manually added the ported TN(s) to an LSR request in the LEC LSR tool. Thereafter, the form was manually uploaded to the ILEC or CLEC. The agent would monitor for a response from the LEC and receive the FOC from the LEC.

Using techniques herein, a methodology 500 can be provided for LSR workflows. Methodology 500 begins at 502 and proceeds to 504 where the TN Platform receives automated ported TN request. The port request may be automatically generated based on the carrier assignments of TNs in a TN order (e.g., order fulfillment requires one or more of the TNs in an order to be ported as determined by a TN platform handling the order). At 506 the TNs are added and submitted to the LEC automatically (e.g., for at least LECs that are automated). At 508 a mechanized LSR status is received from the LEC. At 510 the platform automatically monitors for TNs Test and Turn-Up (T&TU) due date and at 512 automatically send TNs for activation to NPAC on a due date.

System failures can be immediately identified at any step of methodology 500 and may be resolved automatically or manually. In embodiments, at 514, the platform alerts users where one or more TNs are not in a correct status. In embodiments, at 516, the platform can provide information to guide resolution of an incorrect status or other error. On completion, methodology 500 ends at 518.

Methodologies herein can also provide various industry notification or compliance functions. Prior techniques involved decomposing industry data from the order to create files for providing to industry databases (via, e.g., manual upload or automatic provisioning to E911, LIDB, CNAM, et cetera). Industry data files were created and industry distribution agents would manually review, fix discrepancies, and generate an industry macro file on the order due date. The agent thereafter manually uploads the macro file to industry databases.

Methodology 600 automates creation and completion of industry files (e.g., E911 and/or LIDB/CNAM files). Methodology 600 begins at 602 and proceeds to 604 where industry files are automatically created in conjunction with a TN order. Thereafter, at 606, a determination is made by the platform as to whether the timing is proper to add the industry files to industry databases, and at 610 adding the industry files to the industry database after the determination at 606 returns positive. If the determination at 606 returns negative, methodology 600 can proceed to hold at 608 and recycle to 606 to recheck after a delay. In embodiments, a check can be conducted to determine if a reservation has expired or the order (or portion thereof) associated with the TNs for which the industry files were generated is cancelled, with methodology 600 terminating if so. In embodiments, at 612, automatic updates of the industry data can be provided (e.g., after TNs are tested and turned up). On completion, methodology 600 ends at 614.

Methodologies herein can also provide conflict checking capabilities. Conflict checks can ensure that TNs in an order do not exist in any other order. Prior techniques for conflict required complex inter-system communication (between, e.g. BGW, GCP, SPP, OCX, GIOM, Batch Integrated System to Make Automated Record Corrections (BISMARC), TN Platform). Platforms disclosed herein can interface with various programs and automate conflict checking processes. Prior techniques for conducting conflict checks involved manually checking provisioning and billing systems to determine if TNs associated with an order already existed. Provisioning would simply fail if users entered TNs in orders which existed in other systems. The system could conduct "soft edit checks" (e.g., permissive removals or edits such as when a TN exists in a legacy account) or "hard edit checks" (e.g., required removals or edits such as when a TN exists on current ordering service account) if the TN was already billing on certain types of accounts. In the days before T&TU, a conflicted TN can be removed from a conflicted billing system, which requires different activity depending on whether the conflicted TN has a certain account type (e.g., for use with a business network such as AT&T Business Network (ABN)) and/or certain associated data (e.g., Field Identifier (FID)). This process lacks error alerts and can allow orders to progress to billing before failures are identified. Further manual steps are required when billing fails, such as research regarding conflicts, manual disconnects, and manually changing billing dates (which requires manual action from Business Operations Analysis (BOA)).

Figure 7:
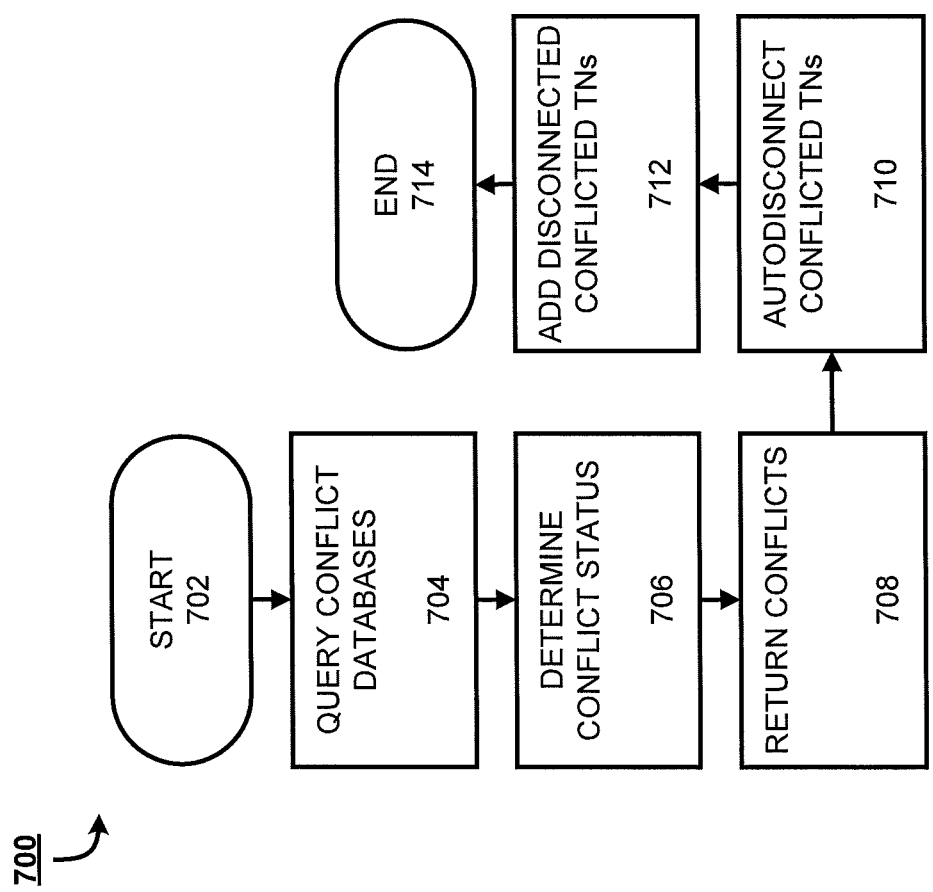
FIG. 7 is an example flow chart of a methodology disclosed herein.

FIG. 7 illustrates methodology 700 for performing conflict checks. Using techniques disclosed herein, an automated conflict check and resolution methodology 700 can begin at 702 and proceed to 704 where the platform retrieves data from systems containing possible conflict information, including but not limited to billing systems, inventory systems, order systems, et cetera (e.g., (BGW), GCP, SPP, OCX, GIOM, BISMARC, TN Platform) to determine if TNs associated with a TN can be provisioned. At 706, TN conflict status is identified. If one or more TNs exist in another billing system, these are flagged as existing on another account; if one or more TNs exist in an inventory system, these are flagged as provisioned to another customer or service; and if one or more TNs exist in an order system, they are flagged as being processed on another service order. At 708, these conflicts are returned and displayed using an interface associated with the TN platform. Return of the conflicts can include reference attributes such as account info, order number, et cetera. At 710, the platform initiates automated disconnect of conflicted TNs to the billing system. At 712, the TN platform automatically adds the effective billing date for the TNs. Using this unified collection, analysis, and interface, the platform eliminates significant complexity and cost associated and reduces cycle time associated with conflict resolution. On completion, methodology 700 ends at 714.

Testing of TNs can also be improved by processes described herein. To test TNs, users previously checked lines for dial tones and attempted to call lines manually. When conflicts existed, such as TNs set for turn up service dedicated to other devices, or when technical problems existed, a technician on-site would identify the problem but sometimes could not resolve it at that time. Automation can reduce or prevent such occurrences.

Figure 8:
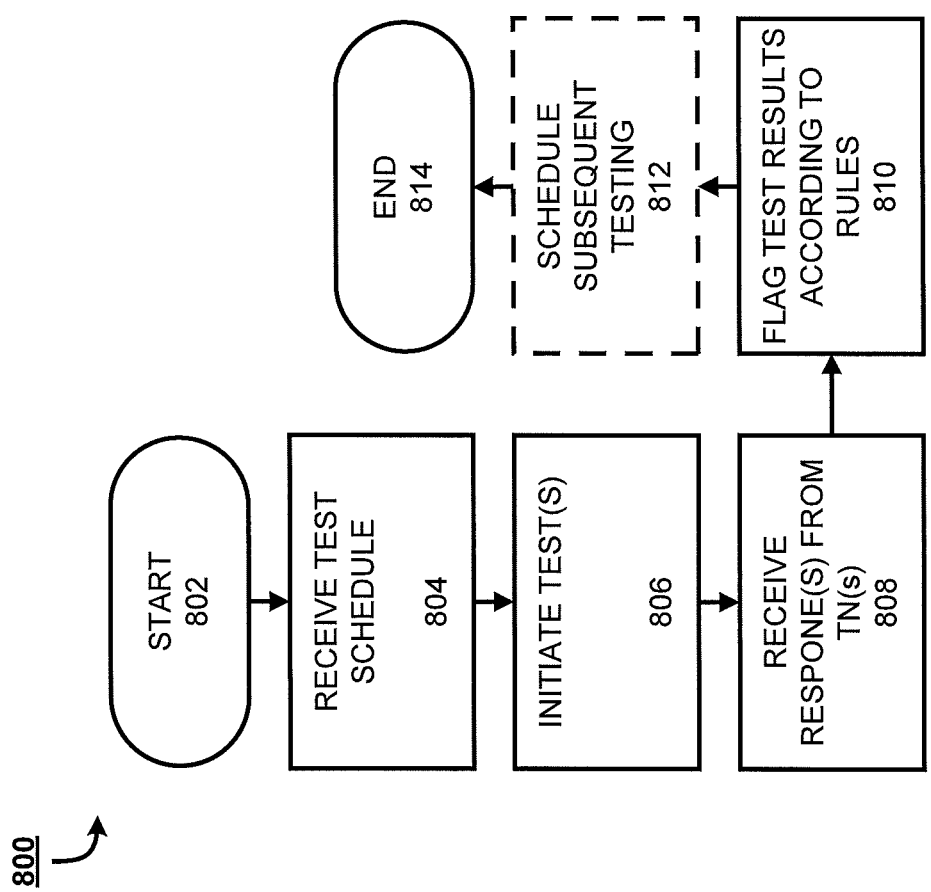
FIG. 8 is an example flow chart of a methodology disclosed herein.

FIG. 8 illustrates methodology 800 for testing TNs. Methodology 800 begins at 802 and at 804 receives customer input, via a user interface of the TN platform, regarding scheduling of TN tests. After the TN tests are scheduled, the TN platform automatically checks the TNs based on the schedule at 806. Testing can include automatically dialing the TN, and/or checking the TN for connection or tone where access to the line itself is available remotely. At 808, the platform receives a response from the tested line (e.g., dial tone, modem pickup, ringing). At 810, the TN platform can flag lines based on the results of the test. Flagging can include identifying lines where the test failed, or where particular line characteristics are identified (e.g., BVOIP eligible line). In embodiments, subsequent tests can be scheduled at 812 where further changes are expected (e.g., after subsequent turn up). This allows end customers to test and retest their TNs and determine their activation or eligibility. On completion, methodology 800 ends at 814.

In embodiments, one or more methodologies herein can be combined in any order. Methodologies or aspects thereof may be performed simultaneously or in conjunction. In this manner, the methodologies described and other aspects of platform 100 can be implemented in an integrated and unified manner providing, to a variety of users and roles, all aspects of TN management described herein.

Figure 9:
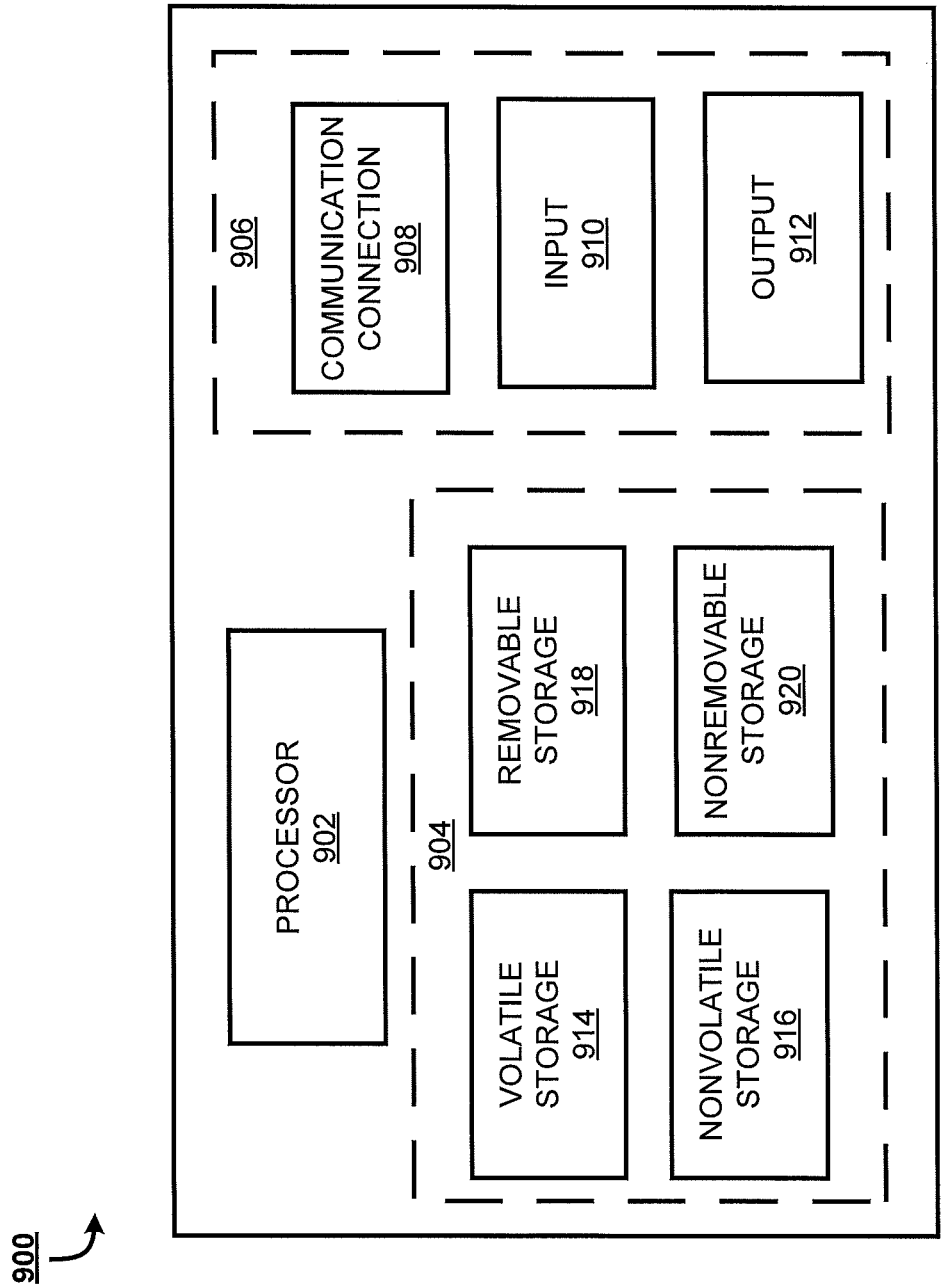
FIG. 9 is a block diagram illustrating an example implementation of a device which can be utilized in conjunction with or comprise a portion of systems disclosed or implement or execute methods herein.

FIG. 9 illustrates a device 900. Device 900 may comprise all or a part of modules or components herein. Device 900 may comprise hardware or a combination of hardware and software. The functionality to facilitate telecommunications via a telecommunications network may reside in one or combinations of links, portals, or connections. Device 900 depicted in FIG. 9 may represent or perform functionality of an appropriate device 900, or combination of modules or components herein. It is emphasized that the block diagram depicted in FIG. 9 is an example and not intended to imply a limitation to a specific implementation or configuration. Thus, device 900 may be implemented in a single device or multiple devices. Multiple network entities may be distributed or centrally located. Multiple network entities may communicate wirelessly, via hard wire, or any appropriate combination thereof.

Device 900 may comprise a processor 902 and a memory 904 coupled to processor 902. Memory 904 may contain executable instructions that, when executed by processor 902, cause processor 902 to effectuate operations associated with aspects disclosed herein. As evident from the description herein, device 900 is not to be construed as software per se.

In addition to processor 902 and memory 904, device 900 may include an input/output system 906. Processor 902, memory 904, and input/output system 906 may be coupled together (coupling not shown in FIG. 9) to allow communications there between. Each portion of device 900 may comprise circuitry for performing functions associated with each respective portion. Thus, each portion may comprise hardware, or a combination of hardware and software. Accordingly, each portion of device 900 is not to be construed as software per se. Input/output system 906 may be capable of receiving or providing information from or to a communications device or other network entities configured for telecommunications. For example input/output system 906 may include a wireless communications (e.g., WiFi/2.5G/3G/4G/GPS) card. Input/output system 906 may be capable of receiving or sending video information, audio information, control information, image information, data, or any combination thereof. Input/output system 906 may be capable of transferring information with device 900. In various configurations, input/output system 906 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 906 may comprise a WiFi finder, a two-way GPS chipset or equivalent, or the like, or a combination thereof.

Input/output system 906 of device 900 also may contain communication connection 908 that allows device 900 to communicate with other devices, network entities, or the like. Communication connection 908 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 906 also may include an input device 910 such as keyboard, mouse, pen, voice input device, or touch input device. Input/output system 906 may also include an output device 912, such as a display, speakers, or a printer.

Processor 902 may be capable of performing functions associated with aspects described herein. For example, processor 902 may be capable of, in conjunction with any other portion of device 900, managing social media communications as described herein.

Memory 904 of device 900 may comprise a storage medium having a concrete, tangible, physical structure. As is known, a signal does not have a concrete, tangible, physical structure. Memory 904, as well as any computer-readable storage medium described herein, is not to be construed as a signal. Memory 904, as well as any computer-readable storage medium described herein, is not to be construed as a transient signal. Memory 904, as well as any computer-readable storage medium described herein, is not to be construed as a propagating signal. Memory 904, as well as any computer-readable storage medium described herein, is to be construed as an article of manufacture.

Memory 904 may store any information utilized in conjunction with telecommunications. Depending upon the exact configuration or type of processor, memory 904 may include a volatile storage 914 (such as some types of RAM), a nonvolatile storage 916 (such as ROM, flash memory), or a combination thereof. Memory 904 may include additional storage (e.g., a removable storage 918 or a nonremovable storage 920) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 900. Memory 904 may comprise executable instructions that, when executed by processor 902, cause processor 902 to effectuate operations for, e.g., listening to social media activity.

Figure 10:
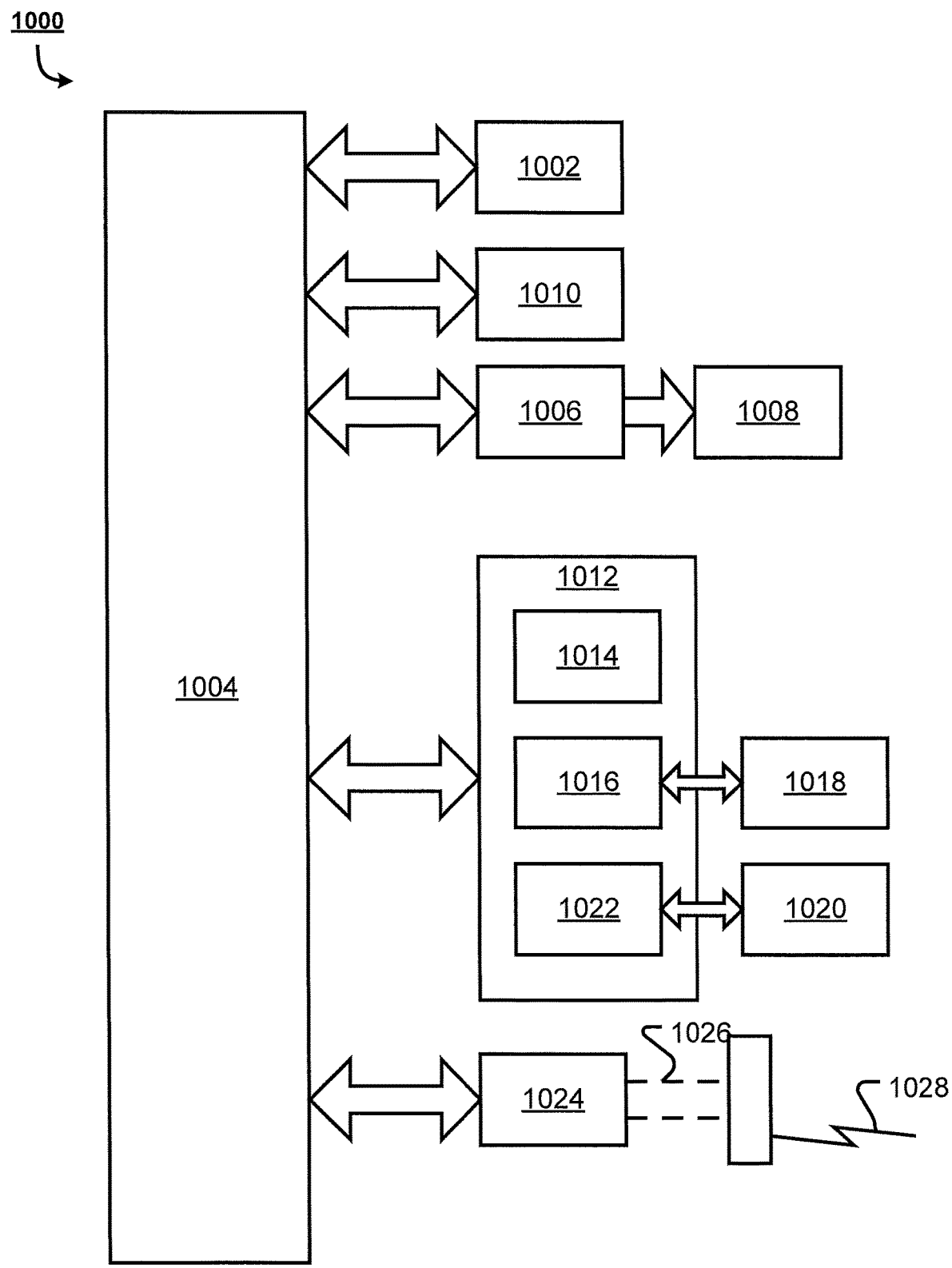
FIG. 10 is a block diagram of a computer system that be used to implement at least a portion of the aspects herein.

FIG. 10 illustrates a computer-based system 1000 that may constitute, include parts of, or be used to realize one or more of aspects of, e.g., platform 100, user interface 200, device 900, or methodologies and techniques described herein. Computer-based system 1000 includes at least one processor, such as a processor 1002. Processor 1002 may be connected to a communication infrastructure 1004, for example, a communications bus, a cross-over bar, a network, or the like. Various software aspects are described in terms of this example computer-based system 1000. Upon perusal of the present description, it will become apparent to a person skilled in the relevant art(s) how to implement the present disclosure using other computer systems or architectures.

Computer-based system 1000 includes a display interface 1006 that forwards graphics, text, or other data from communication infrastructure 1004 or from a frame buffer (not shown) for display on a display unit 1008.

Computer-based system 1000 further includes a main memory 1010, such as random access memory (RAM), and may also include a secondary memory 1012. Secondary memory 1012 may further include, for example, a hard disk drive 1014 or a removable storage drive 1016, representing a floppy disk drive, a magnetic tape drive, an optical disk drive, etc. Removable storage drive 1016 reads from or writes to a removable storage unit 1018 in a well-known manner. Removable storage unit 1018 may represent a floppy disk, magnetic tape, or an optical disk, and may be read by and written to by removable storage drive 1016. As will be appreciated, removable storage unit 1018 includes a computer usable storage medium having computer software or data stored therein.

In accordance with various aspects of the present disclosure, secondary memory 1012 may include other similar devices for allowing computer programs or other instructions to be loaded into computer-based system 1000. Such devices may include, for example, a removable storage unit 1020 and an interface 1022. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 1020 to computer-based system 1000.

Computer-based system 1000 may further include communication interface 1024. Communication interface 1024 may allow software or data to be transferred between computer-based system 1000 and external devices. Examples of communication interface 1024 include, but may not be limited to a modem, a network interface (such as an Ethernet card), a communications port, a Personal Computer Memory Card International Association (PCMCIA) slot and card, or the like. Software or data transferred via communication interface 1024 may be in the form of a number of signals, hereinafter referred to as signals 1026, which may be electronic, electromagnetic, optical or other signals capable of being received by communication interface 1024. Signals 1026 may be provided to communication interface 1024 via a communication path (e.g., channel) 1028. Communication path 1028 carries signals 1026 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 1016, a hard disk installed in hard disk drive 1014, or the like. These computer program products provide software to computer-based system 1000. The present disclosure is directed to such computer program products.

Computer programs (also referred to as computer control logic) may be stored in main memory 1010 or secondary memory 1012. The computer programs may also be received via communication interface 1004. Such computer programs, when executed, enable computer-based system 1000 to perform the functions consistent with the present disclosure, as discussed herein. In particular, the computer programs, when executed, enable processor 1002 to perform the features of the present disclosure. Accordingly, such computer programs represent controllers of computer-based system 1000.

In accordance with an aspect of the present disclosure, where the disclosure is implemented using a software, the software may be stored in a computer program product and loaded into computer-based system 1000 using removable storage drive 1016, hard disk drive 1014, or communication interface 1024. The control logic (software), when executed by processor 1002, causes processor 1002 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special-purpose computer, or other programmable data processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications in systems and networks discussed herein.

Methodologies herein are described with specific aspects for ease of explanation with respect to various embodiments. However, methodologies embraced under the scope and spirit of the disclosure may vary, to include excluding particular aspects or comparisons described.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:

1. A system comprising:
one or more processors; and
memory coupled with the one or more processors, the memory storing executable instructions that when executed by the one or more processors cause the one or more processors to effectuate operations comprising:
receiving a telephone number (TN) order;
reserving one or more TNs of the TN order on a TN reservation system;
collecting customer service record (CSR) information for the one or more TNs;
creating one or more industry files for the one or more TNs automatically in conjunction with receiving the TN order;
determining whether a timing to add the one or more industry files for the one or more TNs to the one or more industry databases has been met; and
providing to one or more industry databases the one or more industry files for the one or more TNs.

2. A system comprising:
one or more processors; and
memory coupled with the one or more processors, the memory storing executable instructions that when executed by the one or more processors cause the one or more processors to effectuate operations comprising:
receiving a telephone number (TN) order;
reserving one or more TNs of the TN order on a TN reservation system;
collecting customer service record (CSR) information for the one or more TNs;
creating one or more industry files for the one or more TNs automatically in conjunction with receiving the TN order;
determining whether a timing to add the one or more industry files for the one or more TNs to the one or more industry databases has not been met;
causing a delay in providing the one or more industry files to one or more industry databases; and
rechecking the timing; and
providing to one or more industry databases the one or more industry files for the one or more TNs.

* * * * *